US011598217B2

(12) United States Patent
Wang et al.

(10) Patent No.: US 11,598,217 B2
(45) Date of Patent: Mar. 7, 2023

(54) METHOD FOR AUTOMATIC CALCULATION OF AXIAL COOLING FAN SHROUD CIRCULAR OPENING SIZE

(71) Applicant: Dassault Systemes Simulia Corp., Johnston, RI (US)

(72) Inventors: Huhu Wang, Livonia, MI (US); Edward Dean Tate, Jr., Grand Blanc, MI (US); Karthik Mahadevan Muthuraman, Livonia, MI (US); Satheesh Kandasamy, Waltham, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 433 days.

(21) Appl. No.: 16/829,190

(22) Filed: Mar. 25, 2020

(65) Prior Publication Data

US 2021/0115802 A1    Apr. 22, 2021

Related U.S. Application Data

(60) Provisional application No. 62/916,317, filed on Oct. 17, 2019.

(51) Int. Cl.
*F01D 5/22*     (2006.01)
*G06T 7/12*     (2017.01)
(Continued)

(52) U.S. Cl.
CPC .............. *F01D 5/225* (2013.01); *F01D 5/16* (2013.01); *G06F 30/28* (2020.01); *G06T 7/12* (2017.01);
(Continued)

(58) Field of Classification Search
CPC . F01D 5/225; F01D 5/16; G06F 30/28; G06F 30/17; G06F 2113/08;
(Continued)

(56) References Cited

U.S. PATENT DOCUMENTS 5,910,902 A    6/1999    Molvig et al.
7,558,714 B2   7/2009    Shan et al.
(Continued)

FOREIGN PATENT DOCUMENTS

CN    107269583       4/2019
JP    2010-248768    11/2010
JP    2017-072922     4/2017

OTHER PUBLICATIONS

Seung Heo et al., "Development of high-performance and low-noise axial-flow fan units in their local operating region", Journal of Mechanical Science and Technology 29 (9) (2015) 3653-3662 (Year: 2015).*

(Continued)

*Primary Examiner* — Steven W Crabb
(74) *Attorney, Agent, or Firm* — Fish & Richardson P.C.

(57) ABSTRACT

Disclosed are techniques for determining shroud size of a fan. The techniques receive by a computer processing system digital data of a three-dimensional representation of a shroud of an axial fan, partition the received data into a first partition corresponding to a shroud segment and a second partition corresponding to a fan segment. determine a shroud boundary ring for the shroud segment and a viewing angle of the shroud boundary ring, apply to an image of the first partition a beam shooting process to determine the shroud diameter, determine if there are pixels in the image, which have values that produce signals indicating that the pixels are coincident with portions of the shroud and when signal is detected, calculate the shroud diameter. One aspect (Continued)

includes using the determined should size opening for performing a flow simulation.

18 Claims, 14 Drawing Sheets

(51) Int. Cl.
    *G06T 7/50*     (2017.01)
    *G06T 7/13*     (2017.01)
    *F01D 5/16*     (2006.01)
    *G06T 17/20*     (2006.01)
    *G06V 10/75*     (2022.01)
    *G06F 30/28*     (2020.01)
    *G06F 30/17*     (2020.01)
    *G06F 113/08*     (2020.01)
    *G06V 10/44*     (2022.01)
    *G06V 20/64*     (2022.01)

(52) U.S. Cl.
    CPC .................. *G06T 7/13* (2017.01); *G06T 7/50* (2017.01); *G06T 17/20* (2013.01); *G06V 10/751* (2022.01); *G06F 30/17* (2020.01); *G06F 2113/08* (2020.01); *G06V 10/44* (2022.01); *G06V 20/647* (2022.01)

(58) Field of Classification Search
    CPC .... G06F 2113/06; G06F 2113/14; G06T 7/12; G06T 7/13; G06T 7/50; G06T 17/20; G06V 10/751; G06V 10/44; G06V 20/647; F01P 5/06; F01P 11/10
See application file for complete search history.

(56) References Cited

U.S. PATENT DOCUMENTS

| | | |
|---|---|---|
| 7,794,204 B2 | 9/2010 | Stevens et al. |
| 2008/0126045 A1 | 5/2008 | Shan et al. |
| 2015/0044058 A1 | 2/2015 | Hamada et al. |
| 2020/0285710 A1 | 9/2020 | Chen et al. |
| 2021/0115935 A1 | 4/2021 | Wang et al. |

OTHER PUBLICATIONS

Zhou et al., "Parametric Design and Numerical Simulation of the Axial-Flow Fan for Electronic Devices," IEEE Transactions on Components and Packaging Technologies, vol. 33, No. 2, Jun. 2010 (Year: 2010).*

Extended European Search Report in European Appln. No. 20201691.1 dated Mar. 17, 2021, 5 pages.

Ren et al., "Response surface method-based optimization of the shroud of an axial cooling fan for high performance and low noise," J. Mechanical Sci. Tech., Jan. 2013, 27(1):33-42.

Zhang et al., "The influence of axial-flow fan trailing edge structure on internal flow," Advances in Mechanical Engineering, 2018, vol. 10(11) 1-12.

* cited by examiner

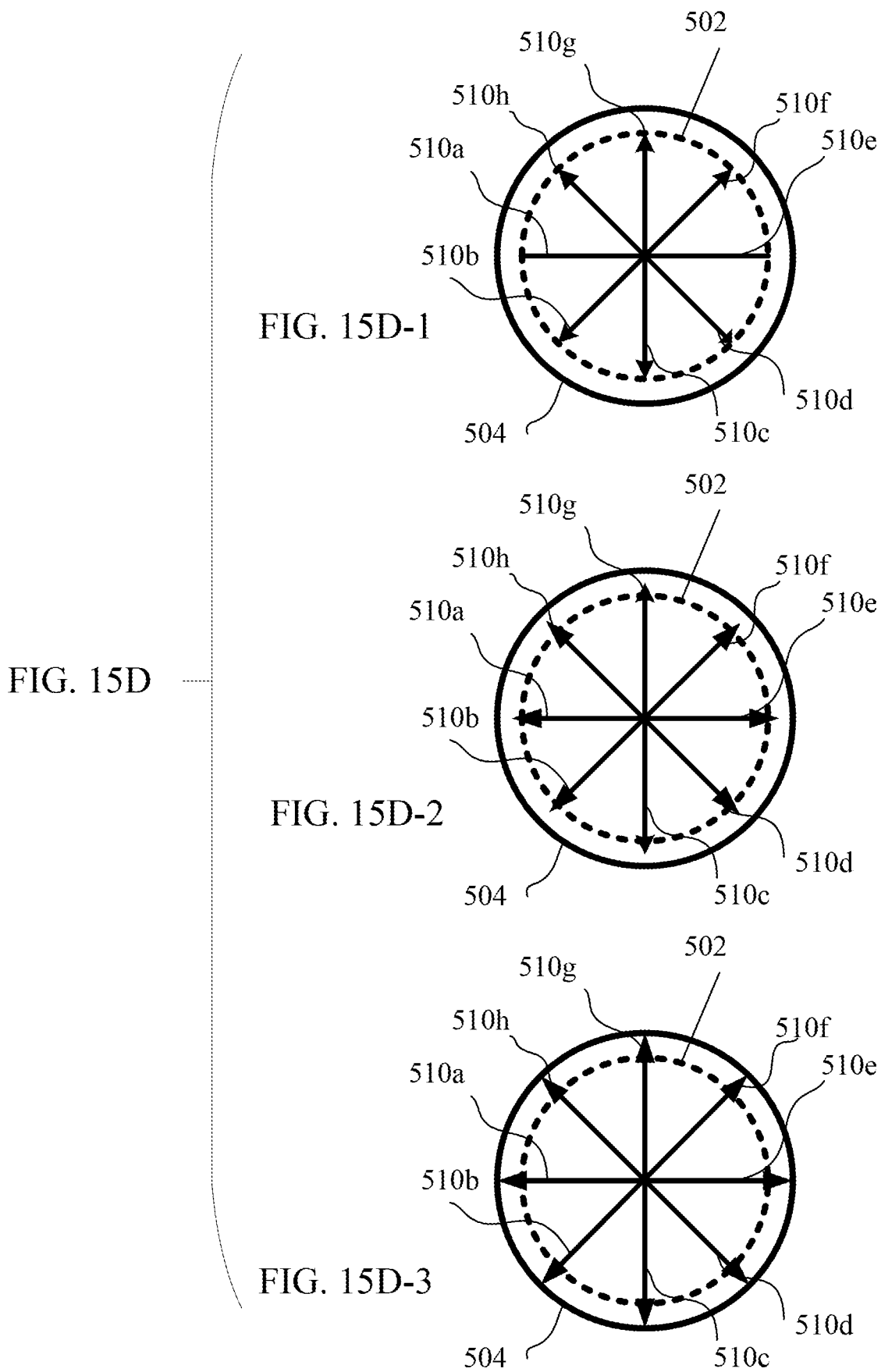

METHOD FOR AUTOMATIC CALCULATION OF AXIAL COOLING FAN SHROUD CIRCULAR OPENING SIZE

CLAIM OF PRIORITY

This application claims priority under 35 USC § 119(e) to U.S. Provisional Patent Application Ser. No. 62/916,317, filed on Oct. 17, 2019, and entitled "Method for Automatic Calculation of Axial Cooling Fan Shroud Circular Opening Size," the entire contents of which are hereby incorporated by reference.

BACKGROUND

This description relates to computer simulation of physical processes, such as physical fluid flows.

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

Some fluid simulations involve simulating fluid flow caused by an axial cooling fan that has blades, a motor and a shroud. When a rotating mesh or local reference frame is used in computational fluid dynamics (CFD) simulations to simulate axial cooling fans, accurately defining the mesh rotating region around the fan is crucial to the accuracy and cost of the simulation. In order to achieve accuracy with low computational cost, the circular opening size of the axial fan shroud it is often necessary to determine the shroud opening size. Determining the shroud opening size for use in a numerical simulation can be a non-trivial process.

Generally, to measure a shroud circular opening size, one needs to use a geometric tool and manually pick three points. The accuracy of the opening size measurement is highly dependent on the selection of and location of these three points, which selection may introduce errors. These errors may become more significant when a shroud is digitally represented in a 3D representation is discretized, and a mesh is applied in which the shroud opening becomes less circular.

Although some tools offer a function to obtain the fan shroud circular opening size indirectly, (see for example, SIMULIA PowerDELTA® function called 'Find Mesh Holes' Dassault Systèmes SIMULIA Corp., Rising Sun Mills Providence, R.I., USA), significant errors may be present when the shroud has some special structures, such as auxiliary attachments, holes, supporters, along the circular opening which discontinue the circular profile.

SUMMARY

According to an aspect, a computer-implemented method for determining shroud size of a fan, includes receiving by a computer processing system digital data of a three dimensional representation of a shroud of an axial fan, partitioning received data into a first partition corresponding to a shroud segment and a second partition corresponding to a fan segment, determining a shroud boundary ring for the shroud segment and a viewing angle of the shroud boundary ring, applying by the computing system to an image of the first partition a beam shooting process to determine the shroud diameter, determining by the computing system if there are pixels in the image, which have values that produce a signal indicating that the pixels are coincident with portions of the shroud, and calculating the shroud diameter when the signal is detected.

The following are some embodiments disclosed herein that are within the scope of the above aspect.

The method further includes determining a viewing angle of the shroud boundary ring. The method further includes repeating the beam shooting and determining until the signal is detected. Calculating the shroud diameter further includes determining from the data of three-dimensional representation of the axial fan, a two-dimensional projection of the shroud to determine the shroud ring. The calculated shroud diameter is determined in the unit of pixels using digital image of the feature lines of the fan so that a conversion ratio between physical units and pixel is obtained.

The method further includes calculating a value corresponding to the center of the fan using the fan image and passing the calculated center value to the shroud image analysis to reduce computational cost.

A viewing vector and the depth of the field of view, and sets the image resolution are based on the fan diameter so that the dimensions of the fan and the shroud do not affect the measurement accuracy.

The beam-shooting process emits plural beams from the fan edges in plural directions to search for the shroud inner circle to reduce the computational cost and increase the signal-to-noise ratio when multiple concentric circles are present. The method further includes excluding certain directions and applying signal high-pass filtering to improve measurement accuracies for structures present along the opening or when the shroud opening is less circular after discretization. The method further includes searching for target pixels along the beam moving direction and among the neighboring pixels.

According to an additional aspect, a computer system includes one or more processors, memory operatively coupled to the one or more processors, and computer storage storing a computer program for determining shroud size of a fan, and which comprises instructions to cause the computer system to receive digital data of a three-dimensional representation of a shroud of an axial fan, partition received data into a first partition corresponding to a shroud segment and a second partition corresponding to a fan segment, determine a shroud boundary ring for the shroud segment and a viewing angle of the shroud boundary ring, apply to an image of the first partition a beam shooting process to determine the shroud diameter. determine if there are pixels in the image, which have values that produce a signal indicating that the pixels are coincident with portions of the shroud, and calculate the shroud diameter when the signal is detected.

The following are some embodiments disclosed herein that are within the scope of the above aspect.

The system determines a viewing angle of the shroud boundary ring and repeats the beam shooting and determining until the signal is detected. The system determines from the data of the three-dimensional representation of the axial fan, a two-dimensional projection of the shroud to determine the shroud ring. The calculated shroud diameter is determined in the unit of pixels using digital image of the feature lines of the fan so that a conversion ratio between physical units and pixel is obtained.

According to an additional aspect, a computer program product stored on a non-transitory computer readable medium for determining shroud size of a fan, includes instructions for causing a system comprising one or more processors and memory to receive digital data of a three-dimensional representation of a shroud of an axial fan, partition received data into a first partition corresponding to a shroud segment and a second partition corresponding to a fan segment, determine a shroud boundary ring for the shroud segment and a viewing angle of the shroud boundary ring, apply to an image of the first partition a beam shooting process to determine the shroud diameter, determine if there are pixels in the image, which have values that produce a signal indicating that the pixels are coincident with portions of the shroud, and calculate the shroud diameter when the signal is detected.

The following are some embodiments disclosed herein that are within the scope of the above aspect.

The product further includes instructions to determine a viewing angle of the shroud boundary ring and repeat the beam shooting and determining until the signal is detected. The instructions to calculate the shroud diameter further include instructions to determine from the data of the three-dimensional representation of the axial fan, a two-dimensional projection of the shroud to determine the shroud ring. The calculated shroud diameter is determined in the unit of pixels using digital image of the feature lines of the fan so that a conversion ratio between physical units and pixel is obtained.

One or more of the aspects may include one or more of the following advantages.

The axial cooling fan shroud circular opening size is measured without human inputs or operations. The image processing method analyzes the 3D geometry in a 2D domain to reduce computational cost and improve accuracy. The process uses a digital image of the feature lines of the 3D geometries of the fan and the shroud instead of edges of the geometries so that no image pre-processing or edge detection is needed.

The techniques disclosed herein can be used for accurately measuring a circular opening size of the axial fan shroud for instances when a rotating mesh or local reference frame is used in computational fluid dynamics (CFD) simulation to simulate an axial cooling fan. These techniques accurately define a mesh rotating region around the fan, which may be crucial to both accuracy and cost of the simulation.

The aspects involve automatic processes that remove human induced errors. The aspects provide circle size measuring techniques that can be much faster, e.g., 10-20 times faster compared to the traditional Circle Hough Transform method. Compared to analyzing a 3D geometry directly, the aspects may generate more accurate results when special structures are present on the shroud opening, if these structures discontinue the circular profile. There may be a lower standard deviation compared to the three-point method when the shroud opening is less circular due to distortions from geometry discretization process, and training costs can be significantly reduced.

BRIEF DESCRIPTION OF THE DRAWINGS

FIG. 15D is a diagram, having component FIGS. 15D-1 to 15D-3, which is useful in understanding aspects of a beam shooting process used the automated process of FIG. 14.

Below is an example application of the automated process for determining axial fan shroud opening size, as applied in a LBM fluid simulation using a turbulent boundary layer model for compressible flows. The use of a LBM fluid simulation and the use of a turbulent boundary layer model are merely illustrative examples of a use of results of the described automated process for determining axial fan shroud opening size.

DETAILED DESCRIPTION

An automated process for correcting determining fan shroud opening size can be used for a fluid flow simulation performed by the simulation engine 34. For example, as described in U.S. patent application Ser. No. 11/463,673, entitled COMPUTER SIMULATION OF PHYSICAL PROCESS (now issued as U.S. Pat. No. 7,558,714) incorporated herein in its entirety by reference.

Figure 8:
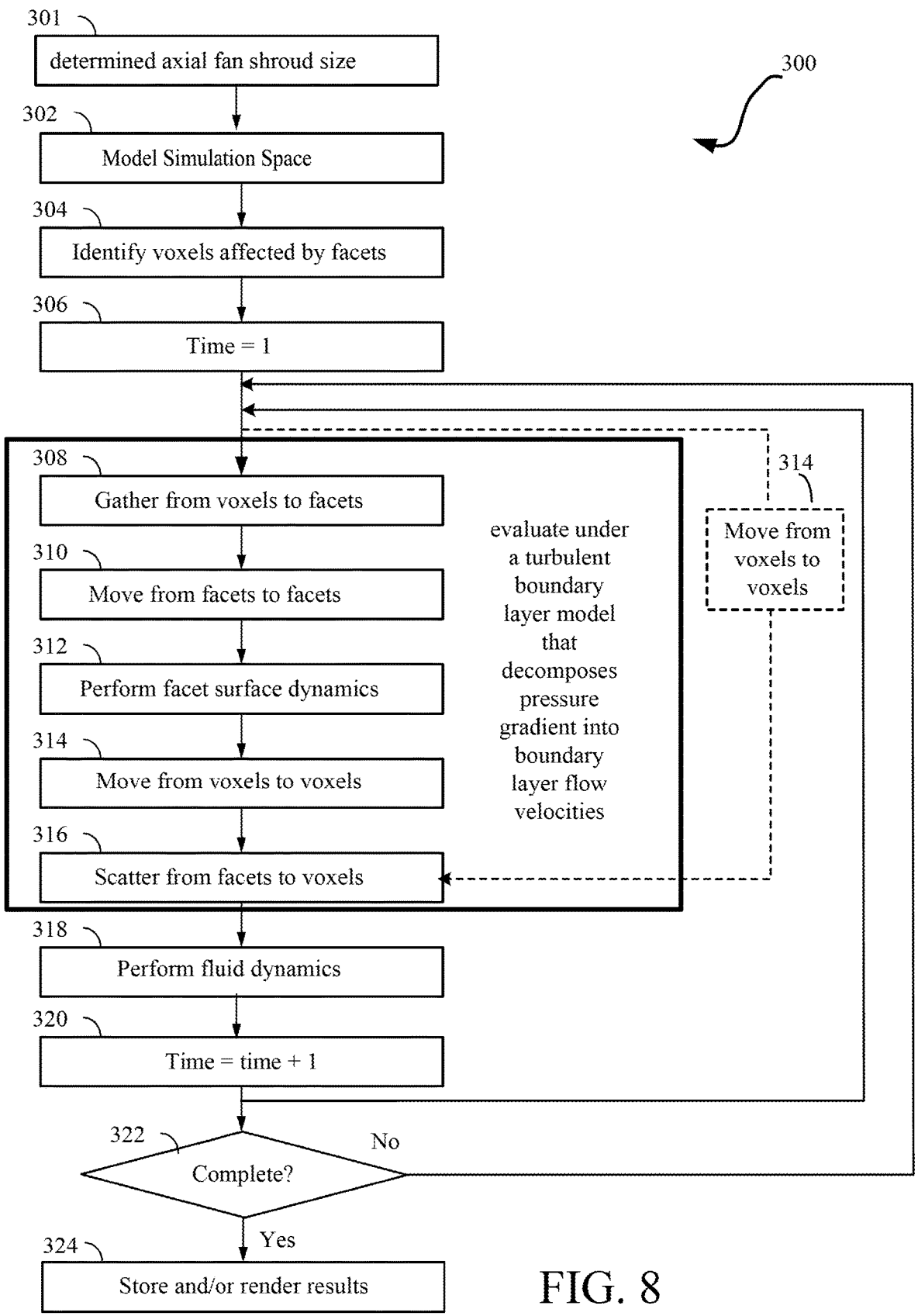
FIG. 8 is a flow chart of a procedure followed by a physical process simulation system.

In FIG. 8 below, a flow simulation process is described using results of the automated process for correctly determining fan shroud opening size to configure a simulation space. In the figures that follow such as FIGS. 9-13, each of these figures are labeled as prior art because these figures appear in the above referenced patent.

However, the figures as they appear in the above Patent do not take into consideration any modifications that would be made to a flow simulation using the automated process for correcting determining fan shroud opening size to configure a simulation space, because that automated process as described herein is not described in the above referenced Patent.

In a LBM-based physical process simulation system, fluid flow is represented by the distribution function values $f_i$, evaluated at a set of discrete velocities $c_i$. The dynamics of the distribution function is governed by the equation below, where $f_i(0)$ is known as the equilibrium distribution function, defined as:

$$f_\alpha^{(0)} = w_{\alpha\rho}\left[1 + u_\alpha + \frac{u_\alpha^2 - u^2}{2} + \frac{u_\alpha(u_\alpha^2 - 3u^2)}{6}\right] \qquad \text{Eq. (I-1)}$$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass p and fluid velocity u, are obtained as simple summations. Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Figure 1:
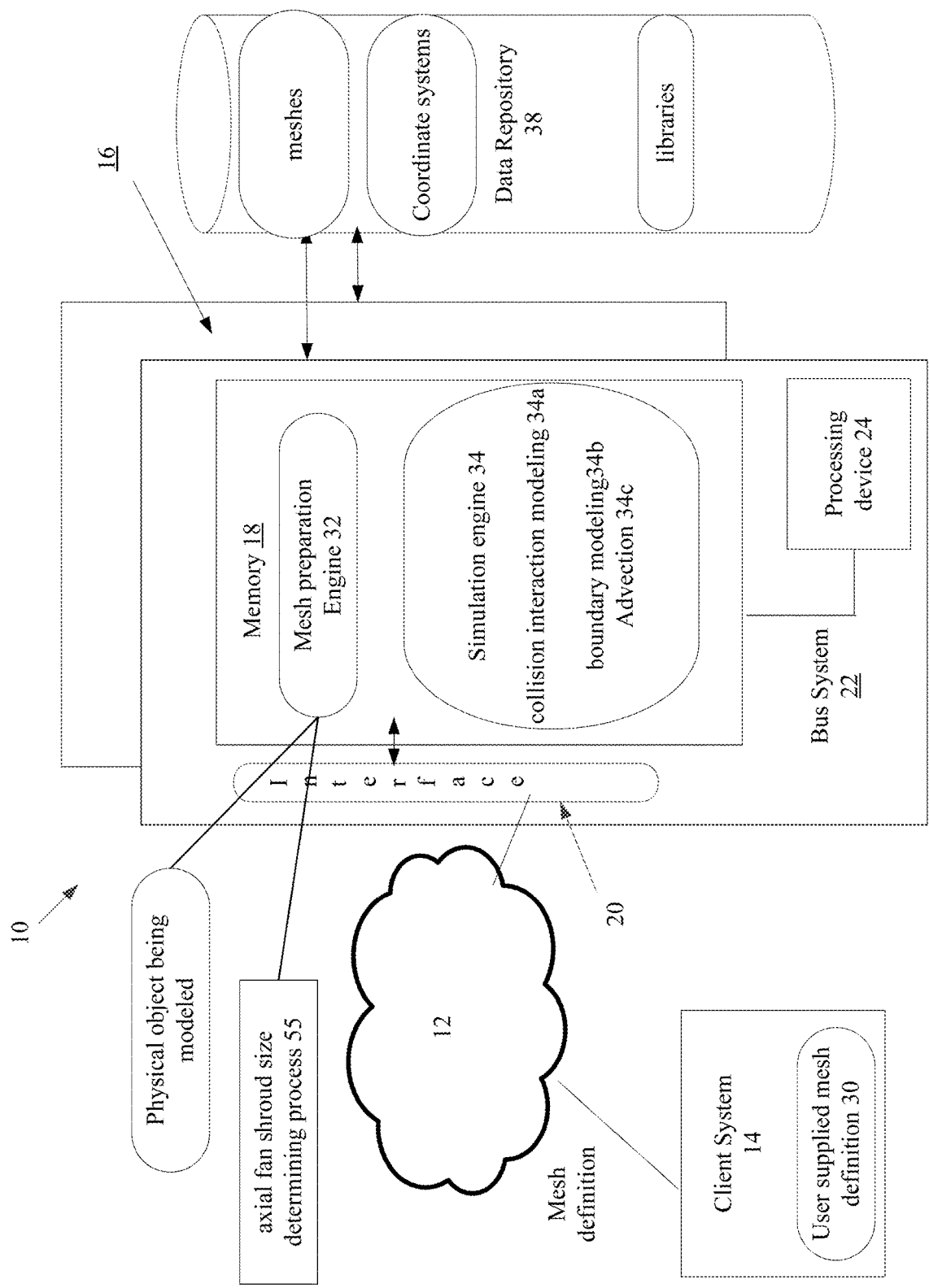
FIG. 1 depicts a system for simulation of fluid flows, which includes a process for determining fan shroud size, with the simulation example using a turbulent boundary layer model for compressible flows.

Referring now to FIG. 1, a system 10 that includes a turbulent boundary layer model that incorporates pressure gradient directional effect 34b for high speed and compressible flows is described. The system 10 in this implementation is based on a client-server or cloud-based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends (and or stores) the prepared mesh to the simulation engine 34 according to a physical object that is being modelled for simulation by the simulation engine 34. The simulation engine 34 includes collision interaction module 34a, boundary module 34b and advection particle collision interaction module 34c. The system 10 accesses a data repository 38 that stores 2D and/or 3D meshes (Cartesian and/or curvilinear), coordinate systems, and libraries.

In the example that will be discussed herein, the physical object is an ventilation system that includes an axial fan having a shroud, with the shroud having a shroud opening. It is desired to have an accurate measurement of the size of the shroud opening of the axial fan. The use of a ventilation system is merely illustrative however, as the physical object can be of any shape, and in particular can have planar and/or curved surface(s). In addition, in some implementations, fluid flow can be in a fluid environment in which the axial fan is positioned. The system 10 accesses a data repository 38 that stores 2D and/or 3D meshes (Cartesian and/or curvilinear), e.g., 32a for the ventilation system and 32b for the axial fan, coordinate systems, and libraries.

Also included is a process for determining a shroud opening size (process 55). Process 55 can be part of the mesh preparation process, a separate process or included in the simulation process. A thorough discussion of this process 55 is set out in FIGS. 15A-15G. As with the mesh preparation engine 32, the process 55 could execute in memory 18 or could be executed on a different system than server 12, and the server receives (and/or stores) the results of the process 55 for use by the simulation engine 34 (or can be used for other applications in which a shroud open size is determined). Use with the simulation engine 34 is merely an example use.

Figures 2, 5:
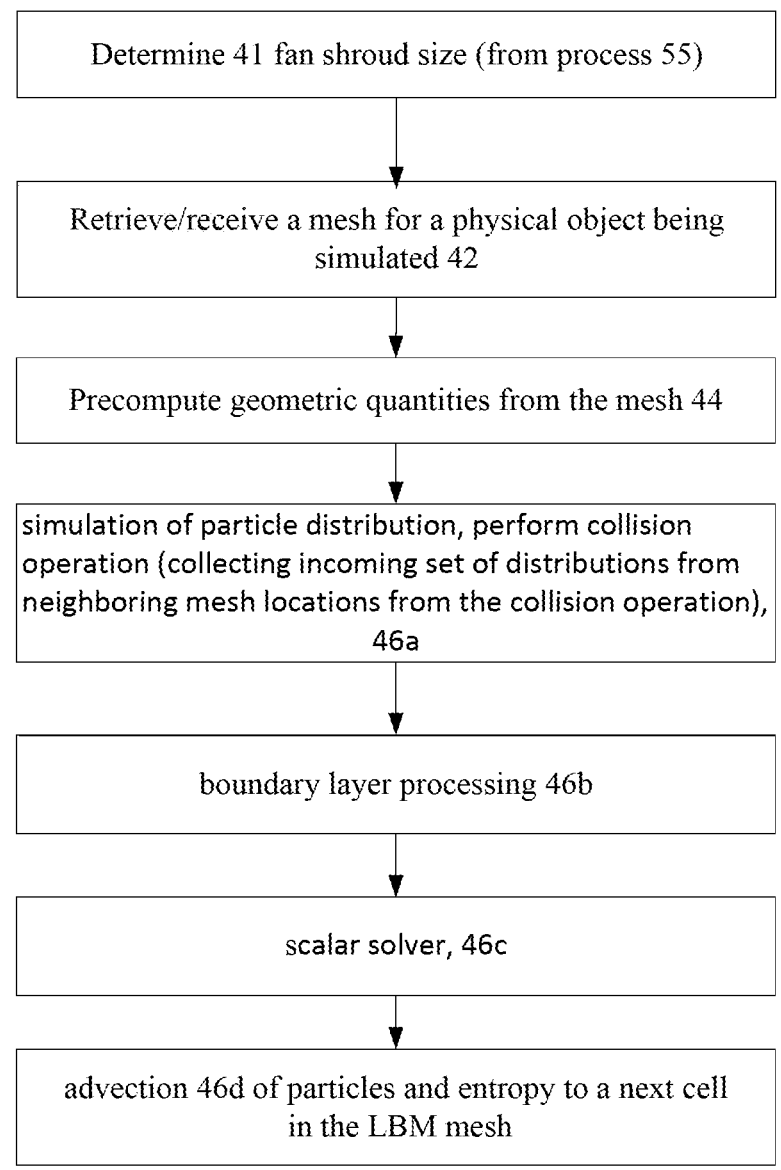
FIG. 2 depicts a flow chart showing operations for formulation of a Lattice Boltzmann Model simulation with the determined fan shroud size and the turbulent boundary layer model.
FIG. 5 depicts a flow chart showing aspects of the turbulent boundary layer model.

Referring now to FIG. 2, a process 40 for simulating fluid flow about a representation of a physical object is shown. The process 40 receives 42, e.g., from client system 14 or retrieves from the data repository 38, a mesh 32a (or grid) for the physical object being simulated, e.g., a ventilation system. In other embodiments, either an external system or the server 12 based on user input, generates the mesh 32a for the physical object being simulated. Application of a mesh to an axial fan could complicate the simulation is situations when the simulation of the fan has the fan as physically rotating during the simulation. Thus, a clearance region between the fan and the shroud needs to be accurately resolved.

The process 40 also receives 42, e.g., from client system 14 or retrieves from the data repository 38, a three-dimensional representation for the axial fan. The process 40 invokes 41 process 55 or process 40 is supplied the calculated axial fan shroud opening size from another system/process that executed process 55. That is, in other embodiments, either an external system or the server 12 executes the process 55 to determine the axial fan shroud opening size and provides that as input to the simulation process 40.

The simulation process 46 simulates evolution of particle distribution according to a lattice Boltzmann equation (LBE). The process precomputes 44 geometric quantities from the retrieved mesh and performs dynamic Lattice Boltzmann Model simulation 46 using the precomputed geometric quantities corresponding to the retrieved mesh. The simulation process 46 simulates evolution of particle distribution according to a lattice Boltzmann equation (LBE). The process 46 performs a collision operation 46a (and collecting an incoming set of distributions from neighboring mesh locations from the collision operation), evaluates 46b flows at physical boundaries according to boundary modeling, when the flow impacts a physical surface, may perform scalar processing by applying a scalar solver 46c, and performs an advection 46d of particles to next cells in the LBM mesh.

Boundary Modeling

Figure 3:
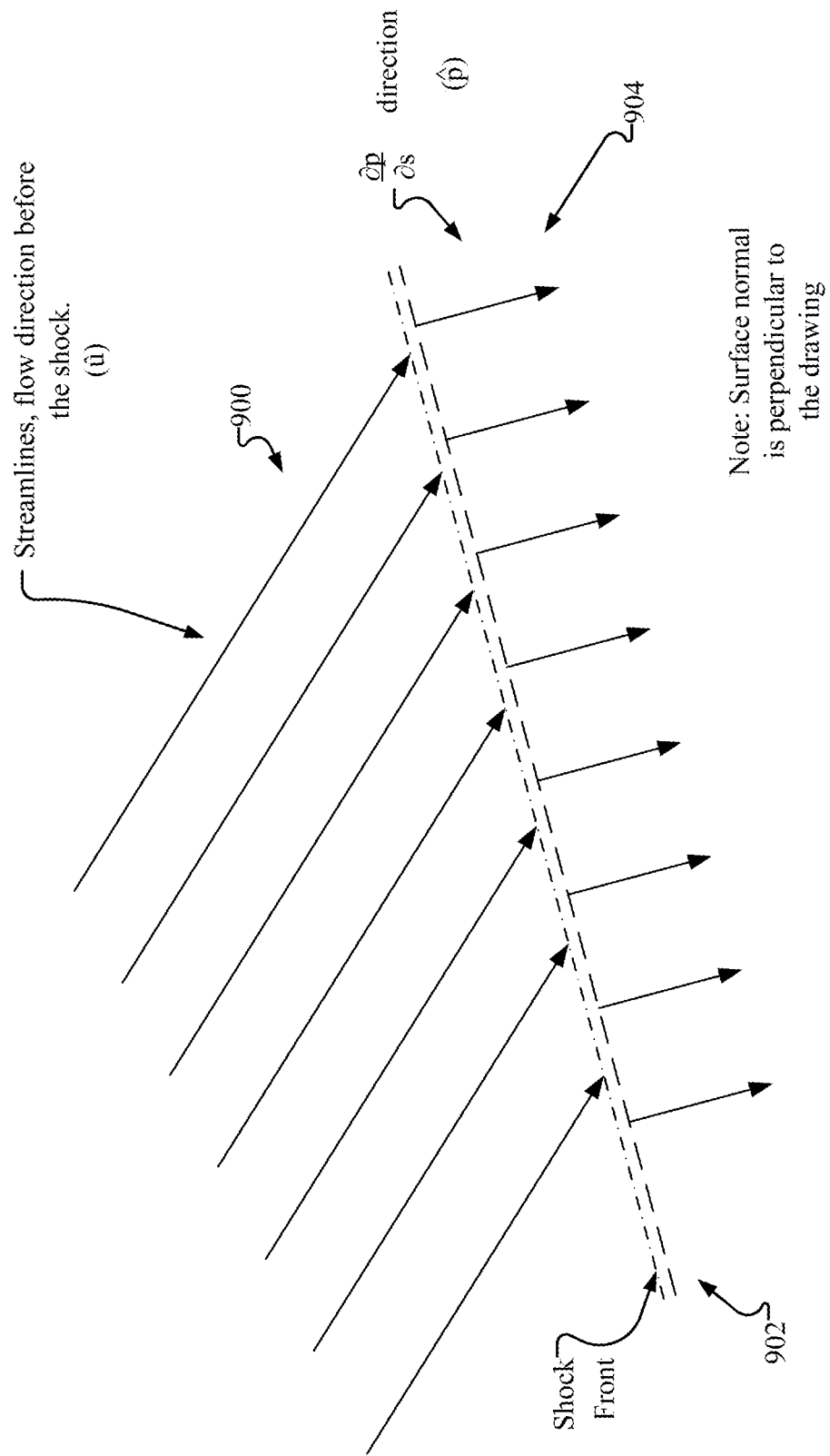
FIG. 3 illustrates the change in direction of a flow when experiencing a shock front (prior art).

Referring now to FIG. 3, change in direction of a flow when experiencing a shock front is illustrated. To correctly simulate interactions with a surface, each facet meets four boundary conditions. First, the combined mass of particles received by a facet should be equal to the combined mass of particles transferred by the facet (i.e., the net mass flux to the facet must equal zero). Second, the combined energy of particles received by a facet should be equal to the combined energy of particles transferred by the facet (i.e., the net energy flux to the facet equals zero). These two conditions may be satisfied by requiring the net mass flux at each energy level (i.e., energy levels one and two) to equal zero.

A boundary layer model can model the wall shear stress (friction) corresponding to the usual no-slip boundary condition that governs the momentum flux occurring at a solid wall, as, $$u_*^2 = v_0 \left.\frac{\partial u}{\partial y}\right|_{y=0} \qquad \text{Eq. (I-2)}$$

where the gradient value is taken at the wall (y=0), $u_*$ is the so-called friction velocity (=square-root of the wall shear stress, $\sqrt{\tau_w/\rho}$, and $\rho$–fluid mass density), and $v_0$ is the molecular kinematic viscosity of the flow. Accurate calculation of this gradient requires resolving the velocity field into very tiny scales up to the wall, which is impractical. A central task in turbulence modeling is to approximate the wall shear stress without directly computing velocity gradient at the wall. This is known as turbulent boundary layer modeling (or wall modeling) in the field of turbulence and computational fluid dynamics.

The formulation of a turbulent boundary layer model resides on the foundation of a fundamental phenomenon of turbulence known as the "law of the wall." That is, if a solid wall is sufficiently flat and a turbulent flow is fully attached along it, over a wide range of locations measured in terms of distance from the wall, the time-averaged velocity profile of a turbulent flow has a known specific, i.e., "universal" form.

This "universal" form is preserved under a scale transformation by certain local intrinsic physics properties such as wall shear stress. Thus, the following expression can be used for the velocity profile, $$U(y)/u_* = \frac{1}{\kappa}\log(y^+) + B \qquad \text{(Eq. 1)}$$

where U(y) is the averaged fluid velocity value along the solid wall measured at distance y from the wall and B is a constant (empirically found to have a value of about 5). The quantity $y^+$ is a dimensionless distance from the wall defined as:

$$y^+ = \frac{yu_*}{v_0}$$

The constant $\kappa$ is the so-called von Karman constant (empirically found to have a value of about 0.41). The logarithmic function form is valid for a wide range of $y^+$ values roughly from 50 to a few hundred or higher. The basic wall model functional form (Eq. 1) can be expanded to cover a wider range of $y^+$ values that include the viscous and transitional sub-layers, $0<y^+<50$. The expanded form is given below, $$U(y)=u_*F(y^+) \qquad \text{(Eq. 2)}$$

It is generally accepted that: $F(y^+)=y^+$ for $0<y^+\le 5$;

$$F(y^+) = \frac{1}{\kappa}\log(y^+) + B,$$

for $y^+\ge 50$; and a transitional profile form is used for $5<y^+<50$.

This "law of the wall," however, is generally only applicable when a boundary layer flow is fully attached along a perfectly flat solid wall, such that velocity variation parallel to the wall is negligible compared to that normal to the wall, which is known as the equilibrium condition. Equation (Eq. 1) defines a relation between the velocity profile (velocity as a function of distance from the wall) and the surface skin-friction. This provides a basis for determining skin-friction without the need of the (unresolvable) velocity gradient information at the wall, which is an observation pertaining to the physics of turbulent boundary layer modeling. The wall shear stress vector defines an effective force by the solid surface acting on the fluid in the direction opposite to the flow velocity direction $$\tau_n = -\rho u_*^2 \hat{u} \qquad \text{(Eq. 3)}$$

where here $\hat{u}$ is the unit vector in the direction of the flow velocity 900.

However, a solid wall (shock front 902) is often not flat. Therefore, it is desirable to extend the "law of the wall" to non-equilibrium situations where there is flow variation in the stream-wise direction caused by, for example, wall curvature. It is known that the leading order effect of curvature to a turbulent boundary layer profile is the presence of a pressure gradient. Various extensions of the basic wall model have been made, which are generally modifications of equation (Eq. 1) to include terms proportional to pressure gradient.

One such extension is described in US Patent (U.S. Pat. No. 5,910,902A), incorporated herein in by reference in its entirety, which patent describes an advanced extension of the basic wall model (Eq. 1) using a specific way to include the pressure gradient effect based on an argument of self-similarity of the boundary layer profile under the influence of a pressure gradient. A generic form of this extension is written as:

$$U(y) = u_* F\left(y^+ \Big/ \xi\left(\frac{dp}{ds}\right)\right) \qquad \text{(Eq. 4)}$$

where $\xi(x)$ is a dimensionless positive function of x. dp/ds denotes the stream-wise (parallel to local fluid velocity) pressure gradient component, $$\frac{dp}{ds} = \nabla p \cdot \hat{s}$$

where $\hat{s}$ is the unit vector in the stream-wise direction. This approach enables the accurately simulation of flows around objects of arbitrary shape, including accurate prediction of boundary layer flow separations.

Existing turbulent boundary layer modeling (including that described in the above U.S. Pat. No. 5,910,902A) assumes that the pressure gradient direction is parallel to the velocity direction in the boundary layer. That is, the extensions to equation (2), such as equation (4), only take into account the stream-wise pressure gradient component contribution, while ignoring the perpendicular pressure component. While this is reasonable for addressing the effect of geometric curvature in the direction of flow, yet it happens that flow along a solid surface is not always in the same direction as the curvature direction. For example, consider a cylinder with its main axis forming an angle (0<θ<90) with respect to the direction of flow. As, a consequence of this geometry, the resulting pressure gradient is neither parallel nor perpendicular to the flow direction. Therefore, a generalization to existing turbulent boundary layer modeling is needed to properly capture the effect of curvature on non-parallel boundary layer flow.

Figure 4:
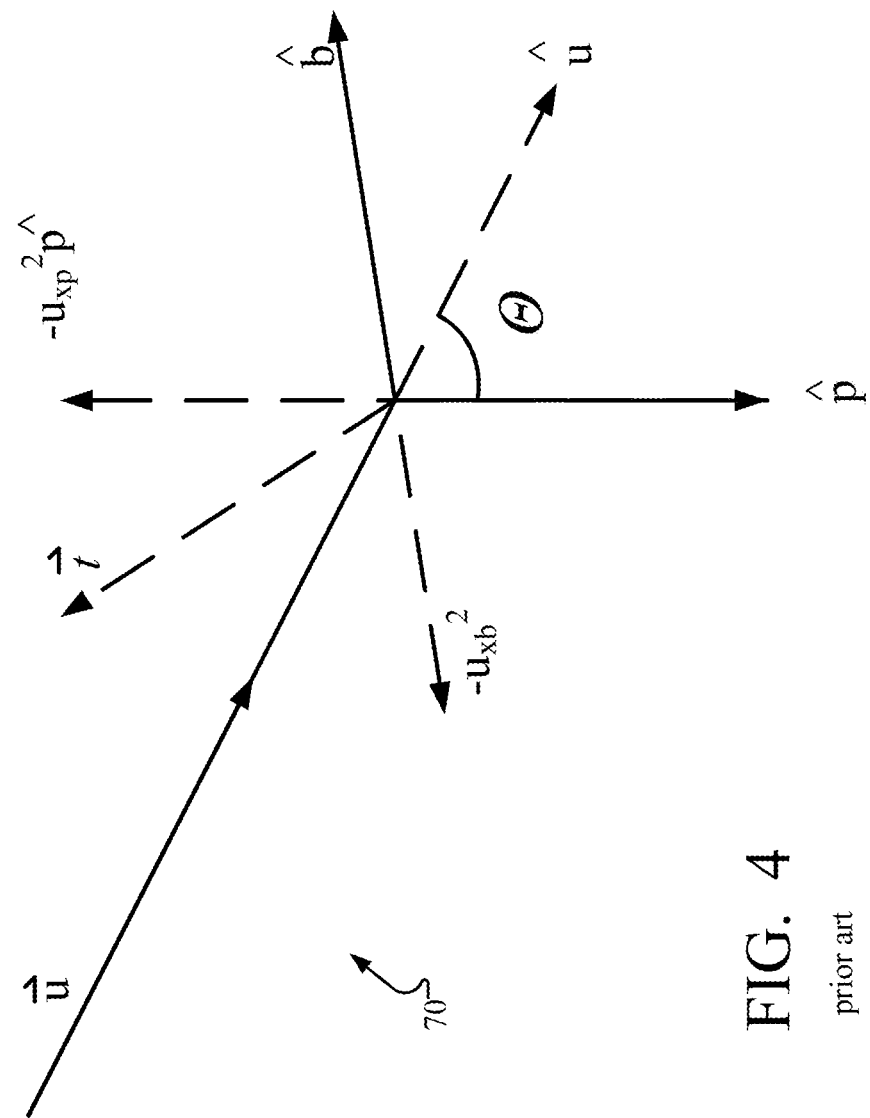
FIG. 4 illustrates a pressure gradient decomposed into components along three orthogonal directions (prior art).

Referring to FIG. 4, as implied above, the pressure gradient can be decomposed into components along three orthogonal directions 70, a direction normal to the wall, and two directions both tangential to the wall, but with one direction the "stream-wise" direction being parallel to the averaged velocity in the boundary layer and the other direction the "span-wise" direction being perpendicular to the wall. Generally, conventional extended wall models the stream-wise pressure gradient component contribution is included, while the span-wise component is ignored or not recognized.

The turbulent boundary layer modeling described herein starts with a different way to deal with the relationship between the pressure gradient direction and the flow velocity direction. Instead of decomposing pressure gradient into the above mentioned three directions (normal to the wall, and two tangential directions, i.e., "stream-wise" and "span-wise"), the process decomposes the boundary layer flow velocity into three directions.

Since the velocity is tangential to the wall, the velocity component normal to the wall is zero, so there are in effect only two velocity directions, i.e., a first direction parallel to the wall-tangent part of the pressure gradient and a second direction perpendicular to the wall-tangent part of the pressure gradient.

Therefore, the velocity vector U can be expressed as:

$$U = U_p \hat{p} + U_b \hat{b} \quad \text{(Eq. 5)}$$

where $\hat{p}$ 904 and $\hat{b}$ are the wall-tangent unit vectors that are parallel to and perpendicular to the wall-tangent part of the pressure gradient direction, respectively. The velocity components are expressed by:

$$U_p = U \cdot \hat{p} \quad \text{(Eq. 6a)}$$

$$U_b = U \cdot \hat{b} \quad \text{(Eq. 6b)}$$

Having decomposed the boundary layer velocity into these two components, it is straightforward to apply appropriate wall modeling based on their two different directions. For the velocity component perpendicular to the pressure gradient, the basic law of the wall model is adopted as in (Eq. 2), namely:

$$U_b(y) = u_{*b} F(y^+) \quad \text{(Eq. 7a)}$$

where the friction velocity $u_{*b}$ corresponds to the skin-friction perpendicular to the pressure gradient direction. In contrast, the extended wall model form (equation (4)) is used for the velocity component parallel to the pressure gradient:

$$U_p(y) = u_{*p} F\left(y^+ \big/ \xi\left(\frac{dp}{ds}\right)\right) \quad \text{(Eq. 7b)}$$

Therefore, the pressure gradient effect is only applied to the parallel component of the boundary layer velocity. In the above, $u_{*p}$ corresponds to the skin-friction parallel to the pressure gradient direction.

In addition, a more careful definition of the stream-wise pressure gradient dp/ds 904 is provided compared to that which has previously been defined and understood. As discussed above, in conventional understanding, dp/ds is the pressure gradient component in the stream-wise direction, that is, the projection of the pressure gradient in the direction of the boundary layer velocity:

$$\frac{dp}{ds} = \nabla p \cdot \hat{u} \quad \text{(Eq. 8)}$$

In contrast with conventional understanding, dp/ds is defined herein as the component of the pressure gradient tangential to the solid surface, which in general is not the same as the velocity direction. Explicitly, dp/ds according to this interpretation is defined as:

$$\frac{dp}{ds}\hat{t} = \nabla p - \hat{n}\hat{n} \cdot \nabla p$$

where $\hat{n}$ is the unit vector normal to the solid surface, and the unit vector $\hat{t}$ is in the direction of projected pressure gradient tangential to the surface (equivalent to the unit vector $\hat{p}$ defined in {Eq. 5).

The absolute value of the new dp/ds is, in general, greater than that of the conventional definition, because $$\frac{dp}{ds}(\text{old}) = \hat{u} \cdot \hat{t} \frac{dp}{ds}(\text{new}).$$

Consequently, the resulting pressure gradient effect is slightly stronger in the new extended wall model. Most importantly, since in general the boundary layer velocity is not parallel to the (tangential part of) the pressure gradient, the resulting skin friction force is no longer parallel to the velocity direction.

Combining all the above, results in a new representation of wall shear stress given as:

$$\tau_n = -\rho(u_{*p}^2 \hat{p} + u_{*b}^2 \hat{b}) \quad \text{(Eq. 9)}$$

It is seen that since $u_{*p}$ is in general not equal to $u_{*b}$, the wall shear stress direction is not parallel to the flow velocity direction. This feature is believed to be lacking in all previous turbulent boundary layer models. It is expected therefore that the described extended wall model will show a substantial improvement for solid wall surfaces that are not flat, therefore, extending the "law of the wall" to non-equilibrium situations where there is flow variation in the stream-wise direction caused by, for example, wall curvature, over conventional wall models. The non-parallel skin friction force effect of the disclosed wall model may provide more accurate predictions of a boundary layer turning phenomena due to presence of a near-wall shock on a curved surface.

Referring to FIG. 5, a turbulent boundary layer model 46b is evaluated. The turbulent boundary layer model determines 82 the boundary layer flow velocities. While there are three directions, the velocity component normal to the wall is considered as zero, so in effect only two velocity directions are determined, i.e., a first direction parallel to the wall-tangent part of the pressure gradient and a second direction perpendicular to the wall-tangent part of the pressure gradient see Eq. 6a and Eq. 6b (above).

Using the two components of the boundary layer velocity Eq. 6a and Eq. 6b (above), the turbulent boundary layer model computes 84 pressure gradients based on these velocity components, by applying in the extended wall model form the velocity component parallel to the pressure gradient given above in Eq. 9, as wall shear stress in which the wall shear stress direction is not parallel to the flow velocity direction.

Figure 6:
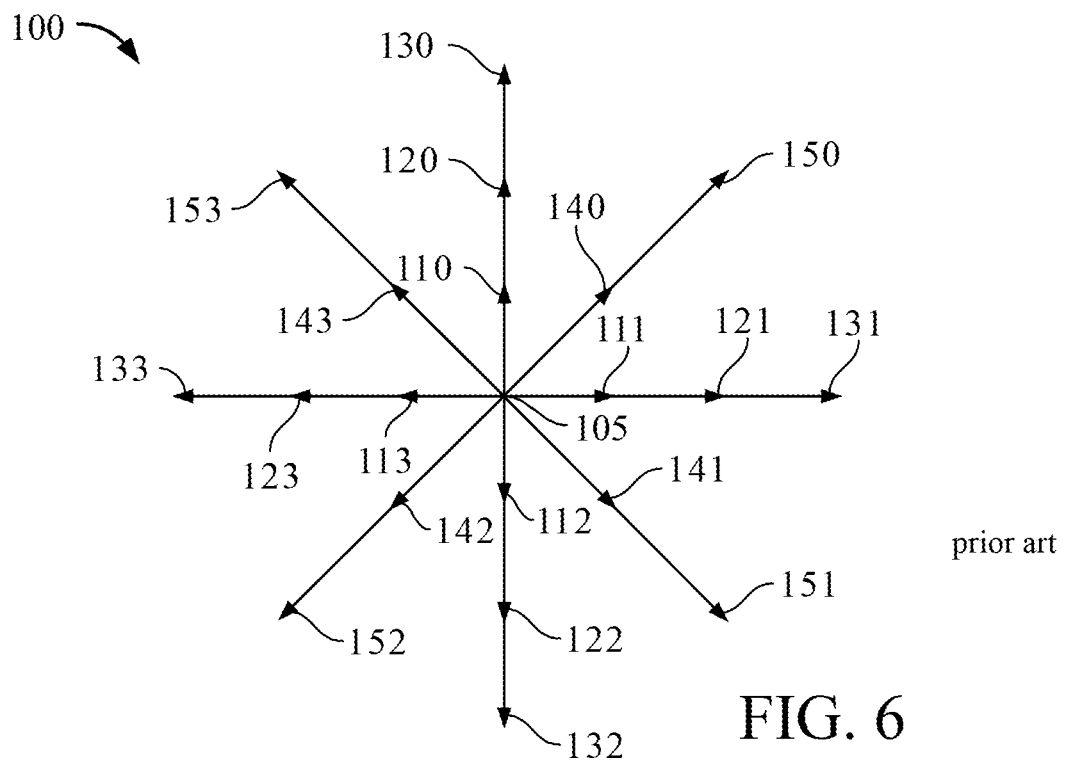
FIGS. 6 and 7 illustrate velocity components of two LBM models (prior art).

Referring to FIG. 6, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 7:
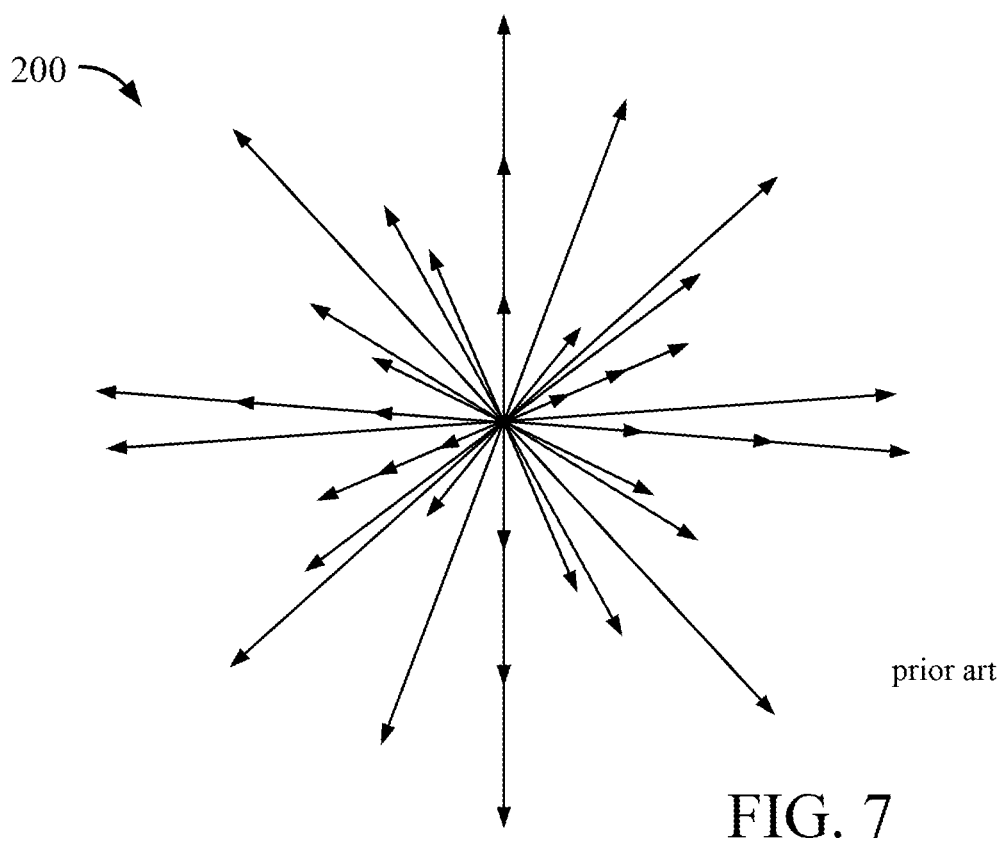

As also illustrated in FIG. 7, a second model (3D-1) 200 is a three-dimensional model that includes 39 velocities, where each velocity is represented by one of the arrowheads of FIG. 7. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Referring to FIG. 8, a physical process simulation system operates according to a procedure 300 to simulate a physical process such as fluid flow, in which an axial fan is disposed. Prior to the simulation, a determined axial fan shroud size is received 301, from execution of a process that automatically calculates the axial fan shroud size, (as in FIGS. 14 and 15A-15G), and applied 301 to a fluid simulation. As part of the fluid simulation, a simulation space is modeled as a collection of voxels (step 302). Typically, the simulation space is generated using a computer-aided-design (CAD) program. For example, a CAD program could be used to draw the axial fan in a ventilation system. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (ν) of the flow, the characteristic length (L) of an object in the flow, and the characteristic velocity (u) of the flow:

$$Re=uL/\nu. \quad \text{Eq. (I-3)}$$

The characteristic length of an object represents large scale features of the object. For example, if flow around a micro-device were being simulated, the height of the micro-device might be considered to be the characteristic length. For a flow about an axial fan the diameter of the fan might be considered as the characteristic length. When flow around small regions of an object (e.g., a gap region between the fan and the shroud) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}).$$  Eq.(I-4)

The energy level zero state represents stopped particles that are not moving in any dimension, i.e. $C_{stopped} = (0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector $f(x)$. The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

During simulation when the process encounters in the mesh a location corresponding to a surface of a physical object or the device the process performs the above functions by evaluating under the turbulent boundary layer model that decomposes pressure gradient into boundary layer flow velocities, as discussed above.

Figure 9:
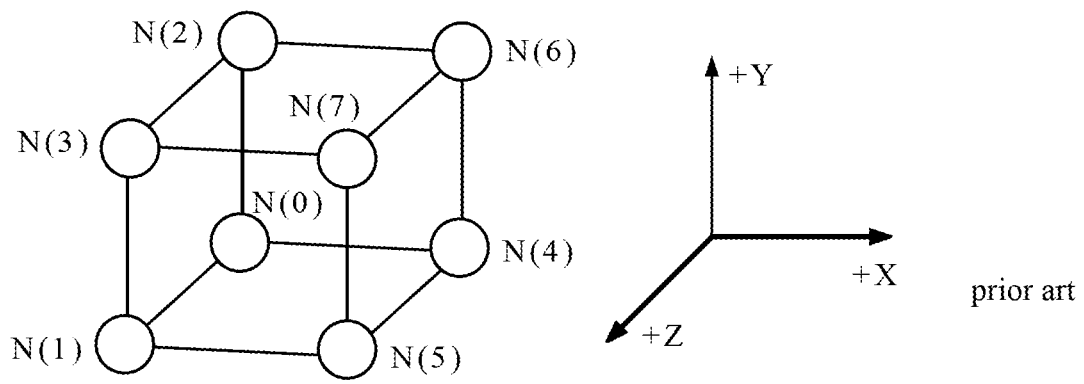
FIG. 9 is a perspective view of a microblock (prior art).

Referring now to FIG. 9, a microblock is illustrated. For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0,1,2,\ldots,7\}$.

Figure 10A:
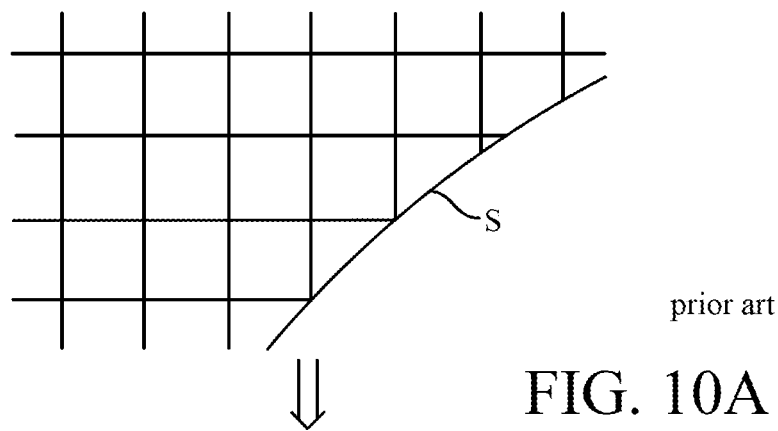
FIGS. 10A and 10B are illustrations of lattice structures (prior art).
Figure 10B:
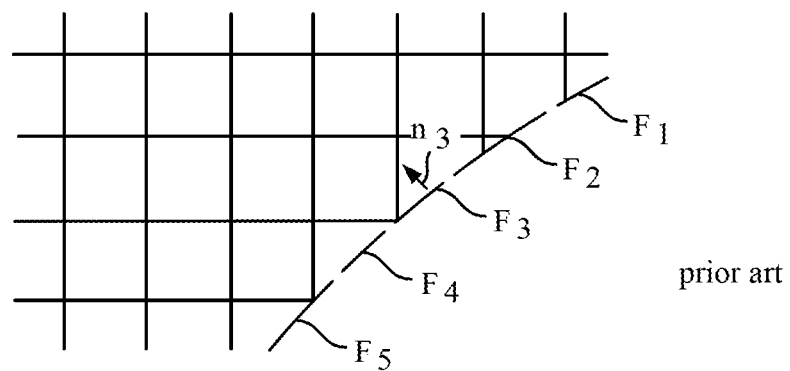

Referring to FIGS. 10A and 10B, a surface S (FIG. 10A) is represented in the simulation space (FIG. 10B) as a collection of facets $F_\alpha$:

$$S\{F_\alpha\}$$  Eq.(I-5)

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 11:
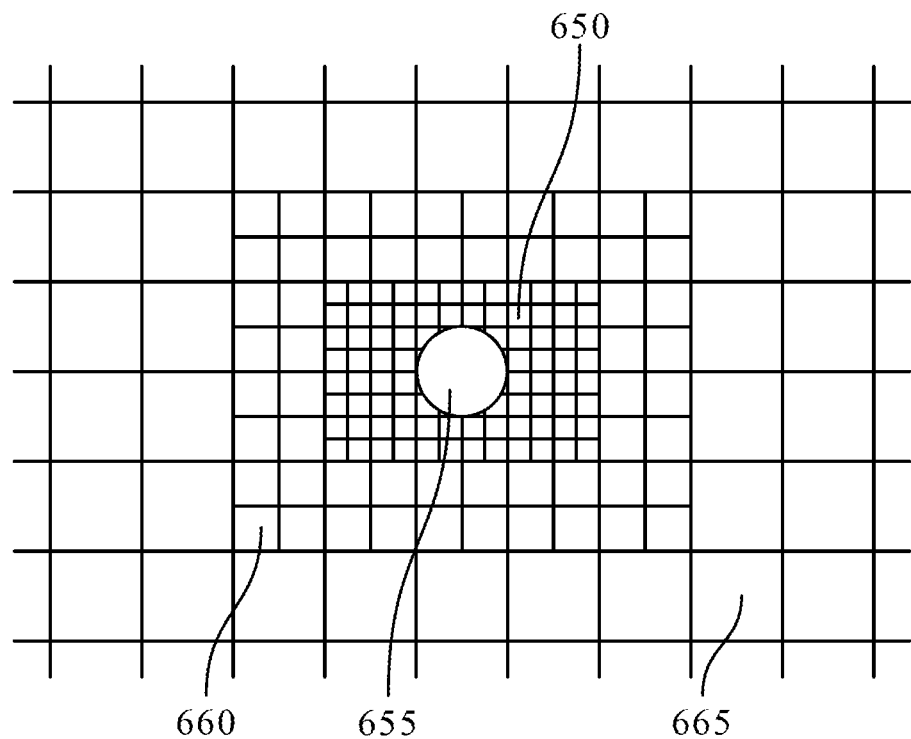
FIGS. 11 and 12 illustrate variable resolution techniques (prior art).

Referring to FIG. 11, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655.

Figure 12:
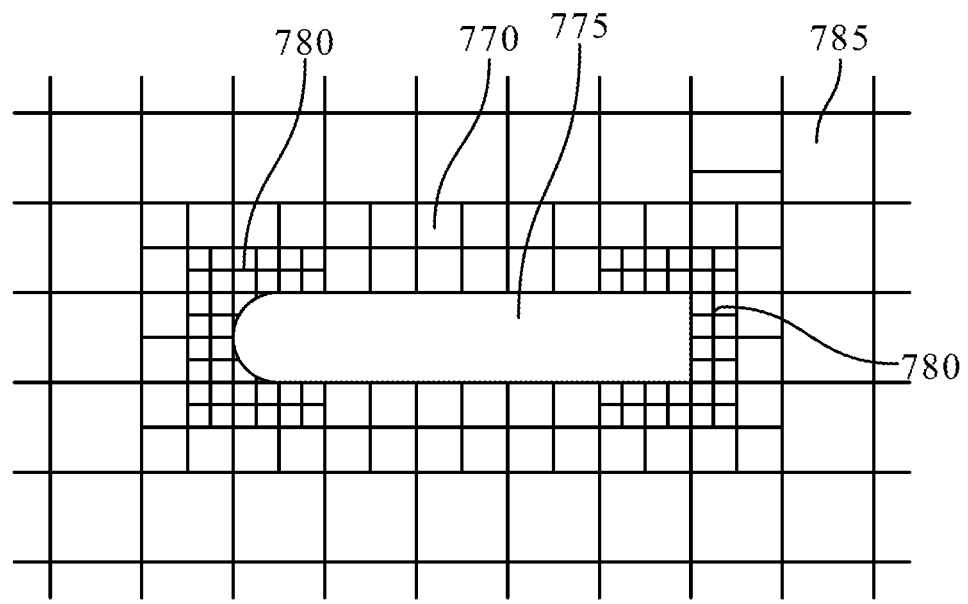

Similarly, as illustrated in FIG. 12, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

Identify Voxels Affected by Facets

Referring again to FIG. 8, once the simulation space has been modeled (step 302), taking into consideration the determined axial fan shroud size, voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 13:
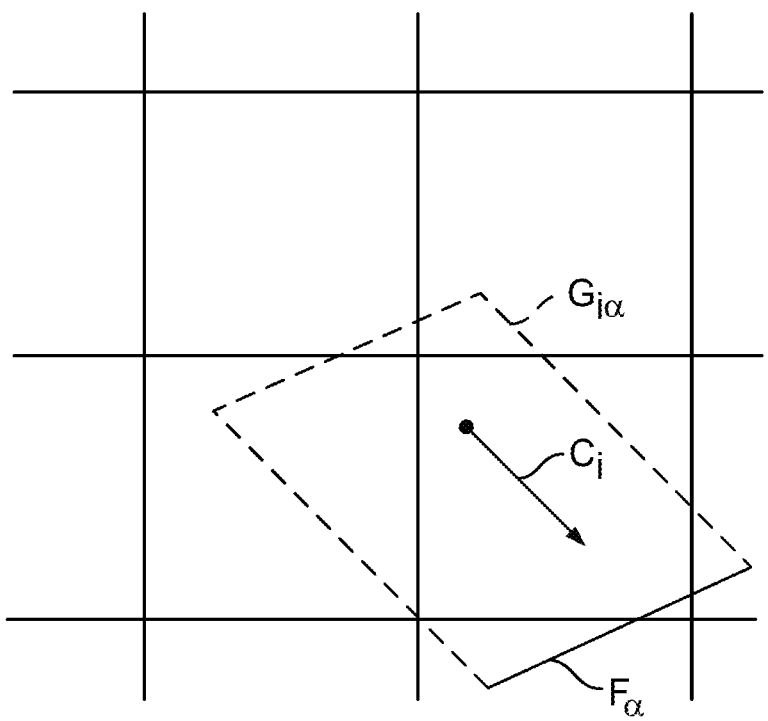
FIG. 13 illustrates regions affected by a facet of a surface (prior art).

Referring to FIG. 13, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha$$  Eq.(I-6)

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x).$$  Eq.(I-7)

When the parallelepiped $G_{i\alpha}$ is intersected by one or more facets, the following condition is true:

$$V_{i\alpha} = V_\alpha(x) + \Sigma V_{i\alpha}(\beta) \qquad \text{Eq.(I-8)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = V_{i\alpha}(x). \qquad \text{Eq.(I-9)}$$

Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

Automatically Measuring Shroud Circular Opening Size

Figure 14:
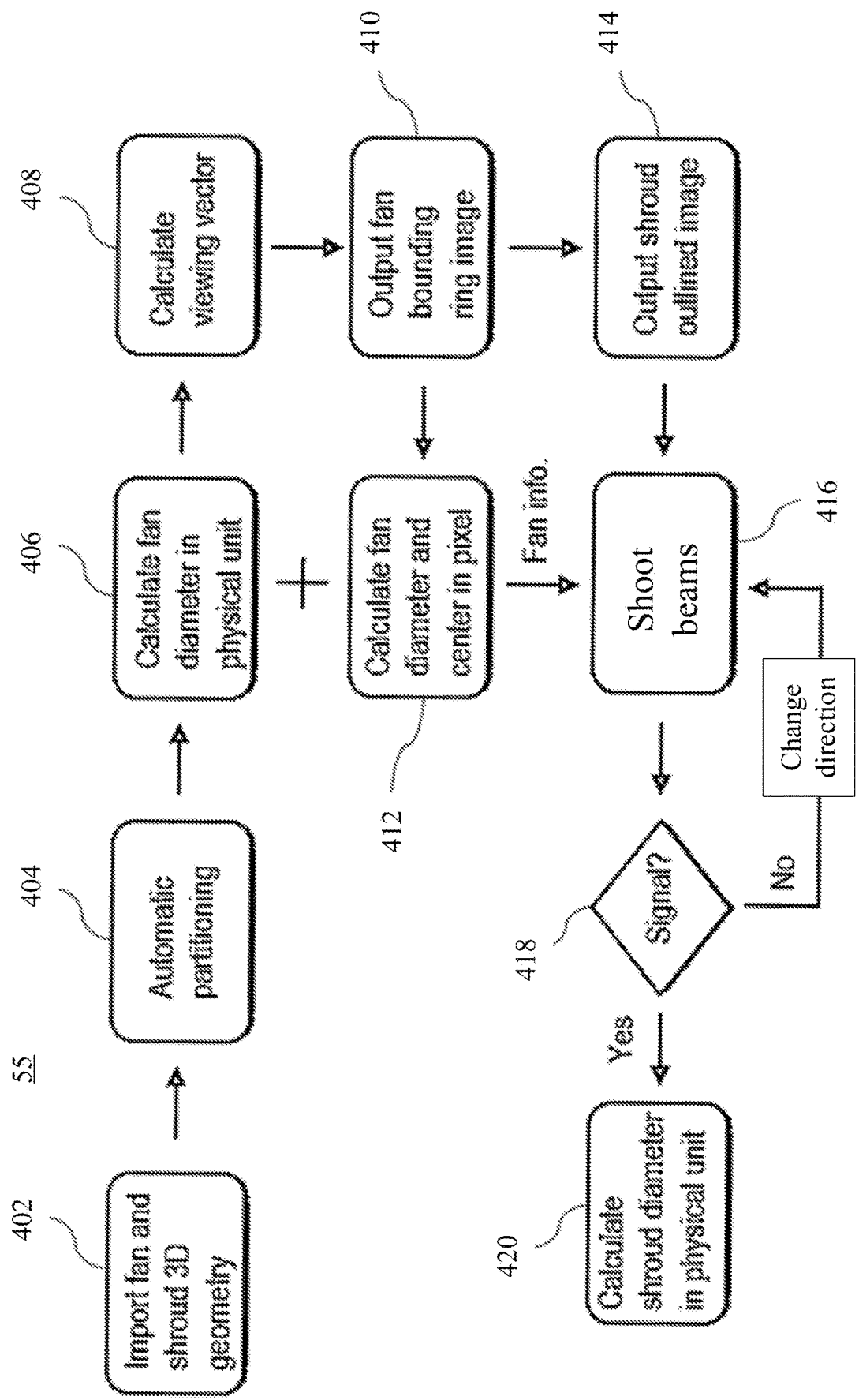
FIG. 14 is a flow chart of an automated process for determining axial fan shroud opening size that can be used in various applications such as fluid simulations.

Referring to FIG. 14, the process 55 for automatic determination of axial fan shroud circular opening size is shown. Process 55 is executed on a computer system. Each of the component features of process 55 are discussed below in conjunction with images FIGS. 15A to 15G that elaborate on aspects of the component features of process 55.

Importing

Figure 15A:
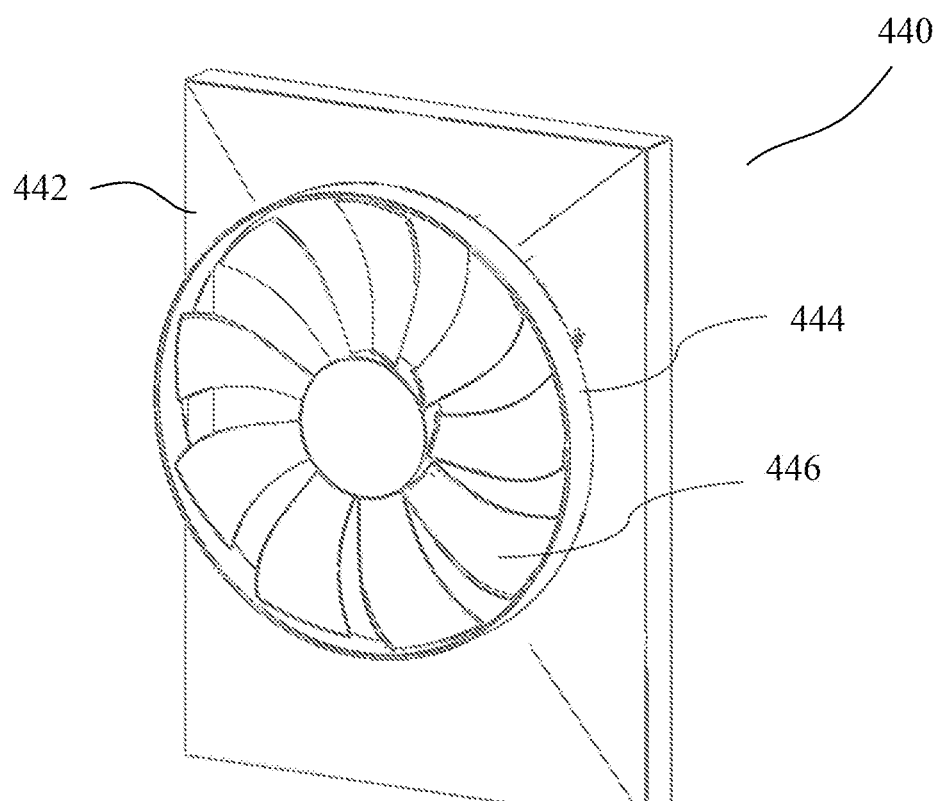
FIGS. 15A-15C, 15E-15G are diagrams useful in understanding aspects of the automated process of FIG. 14.

The process 55 imports 402 a 3D digital representation of an axial cooling fan and its corresponding shroud. FIG. 15A, shows a typical set 440 of an axial cooling fan 442, an enclosing shroud 444 and blades 446. The importing feature 402 of process 55 uses an image processing method that analyzes a complex 3D (three dimensional) representation of the axial fan 442 (FIG. 15A) that is "projected" into a 2D (two dimensional) domain representation that contains a profile view of the shroud 444. The shroud 444 usually has a circular opening at one side that encloses the fan 442 to provide a smoother and more stable air flow through the blades 446. The digital format that is used to import the data set can be either a computer aided design (CAD) format or a mesh format. Other digital formats could be used.

Partitioning

Referring back to FIG. 14, process 55 partitions 404 the digital representation of the axial cooling fan into the fan and the shroud. That is, the fan and the shroud are automatically partitioned or grouped so that these components can analyzed and processed separately by process 55. These components, e.g., fan 442, shroud 444, blades 446, (FIG. 15A) etc., such as a motor, are labeled following predefined rules before a dataset having these data and labels are used by process 55, so that the individual features can be automatically detected in the process 55 and processed separately, as needed.

Fan Diameter Calculation

The process 55 automatically calculates 406, axial fan diameter and expresses this calculation in physical units such as milli-meters (mm) or inches (in). (In an alternate embodiment, this calculation 406 can be skipped if the fan dimension is obtained from user input, although this alternative reduces the automation level of the process.)

Figure 15B:
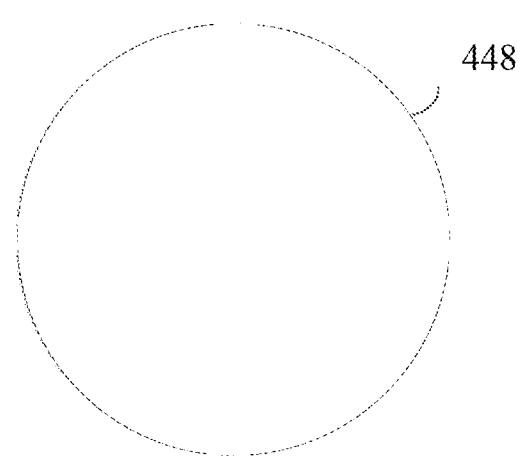

The process 55 automatically calculates the axial fan diameter 406 by producing a set of vertices that follow the shape contours of the fan geometry in a radial direction. These vertices are connected using lines to form a polyline. The polyline is resolved along the axial fan rotating axis to form a cylindrical revolution volume or a fan bounding ring 410. FIG. 15B illustrates the fan bounding ring 448 that is generated by the process 55, and which facilitates the shroud circular opening size calculation 406. The maximum distance along the radial direction at the same plane of the generated fan bounding ring is the diameter of the axial fan.

Viewing Vector Calculation

Figure 15C:
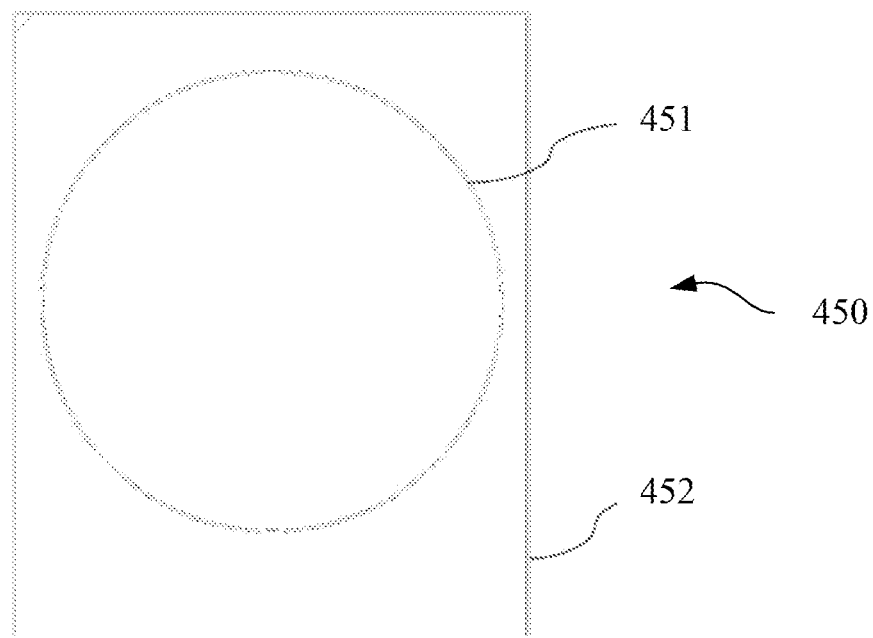

Continuing with FIG. 14, either the calculated fan diameter 406 (or the user supplied fan diameter) is used by the process 55 as input to calculate 408 a viewing vector for generating images corresponding to screenshots of target representations of the fan shroud and fan. The process 55 outputs 410 the generated fan bounding ring 448 (FIG. 15B) to a module that calculates 412 the fan diameter and the center of the fan expressed in pixels. The process 55 also outputs 410 the generated fan bounding ring 448 (FIG. 15B) to a module that generates 414 the shroud outlined image 450 including the circular opening 451 and frame 452, as shown in FIG. 15C.

Fan Diameter Calculation

Continuing with FIG. 14, the fan diameter (also the ring diameter) and the center of the fan are calculated 412 by process 55 in units of pixels using the fan bounding ring image shown in FIG. 15B. Together with the calculation 406 of the fan diameter, correspondence data between the physical units and the pixels are established. The calculated fan diameter, ring diameter and the center of the fan data generated by calculation 412 and the generated outlined shroud image 414 are input to a beam shooting module 416.

Beam Shooting

Continuing with FIG. 14, process 55 uses a beam shooting method 416 to measure the shroud circular opening size or shroud diameter. The beam shooting method used in the system is similar to "ray tracing" used in the 3D computer graphics field. The difference is that the beam shooting method used in the system performs tracking in the 2D image domain. The beam shooting method emits tracing rays from the center along the radial direction. The actual starting position, however, is located at 510$h$, an imaginary fan bounding to save computational resources. The beams keep checking the pixel values in each marching step in space until the beams intersect with the target objects or reach the pre-defined outer boundary.

Referring now also to FIG. 15D, this figure illustrates a starting stage (FIG. 15D-1) an intermediate stage (FIG. 15D-2) and an ending stage (FIG. 15D-3) of beam shooting process 500. Beam shooting is used to measure the shroud diameter, i.e., the shroud opening size, at which a search process starts from the imaginary fan bounding ring according to an embodiment. Circle 502 shown as a phantom line represents the calculated fan bounding ring. The outer circle 504 shown as a solid line is the shroud opening. These two circles 502, 504 are concentric. The area between them is a fan clearance region. The beam shooting measures the boundaries of this fan clearance region. A stopping limit is slightly outside the shroud opening 504 to ensure that the whole fan clearance region is covered.

Each of the FIGS. 15D-1 to 15D-3 shows eight lines 510$a$-510$h$. FIG. 15D-1 shows these lines with arrowheads touching circle 502, FIG. 15D-2 shows these lines with arrowheads terminated in a gap between circle 502 and a circle 504, and FIG. 15D-3 shows these lines with arrowheads terminated at circle 504. These lines 510a-510h with arrowheads are the 'beams' that are emitted from the center of the concentric circles 502, 504. Note the number of beams presented in this figure is for demonstrating purposes only and may not represent the actual values, as fewer or more beams could be used in any embodiment.

FIGS. 15D-1 to 15D-3, viewed sequentially, illustrate the beam trajectory with the view of FIG. 15D-1 representing a start stage, the view of FIG. 15D-2 representing an intermediate stage and the view of FIG. 15D-3 representing a final stage.

The lines 510a-510g represent the same beams, but at different stages in time. The searching starts from the fan bounding ring 502 and terminates whenever one or more of one of the lines 510a-510g representing the beams hits an object. A signal is generated when the one or more of the lines 510a-510g representing the beam(s) hits an object or the searching is terminated before one of the lines 510a-510g representing the beams reaches a pre-defined upper limit. This signal includes the information such as a beam shooting angle, a length of travel of the beam prior to termination of the beam. This length, limited to this description, is called the 'free path length.'

FIG. 15D-2 illustrates the intermediate stage of the beam shooting process at which lines 510a-510g representing the beams reach the middle of the fan clearance region. There are instances for which certain special fitting structures are present along the circular shroud opening. FIG. 15D-3 illustrates a stage of the beam shooting process at which the beam hits the shroud inner boundary and generates a valid signal.

Figure 15E:
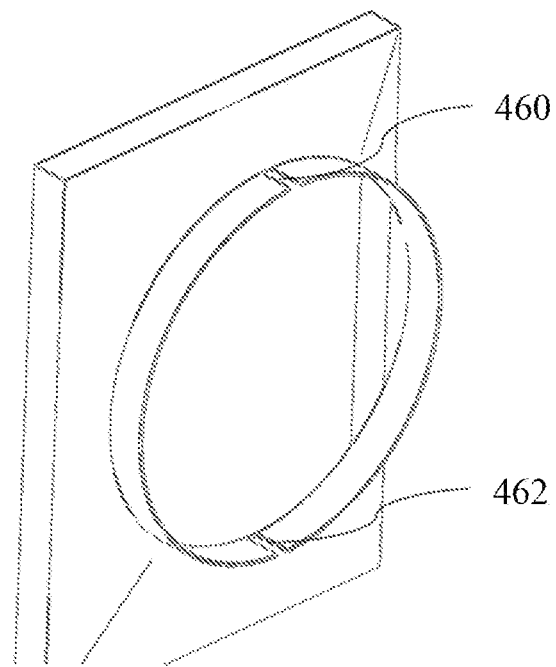

FIG. 15E illustrates structures such as cuts or holes as depicted, where lines 510a-510g representing the beams will leak from these cuts 460 and 462 and end with either no signal or some noise. When lines 510a-510g representing the beams hit other objects near the cuts or holes, such noise affects the accuracy of the result. To address this issue, the process ignores signals from certain directions in which those special structures are normally located based on real axial cooling fan shrouds used in the industry.

A signal checking step 418 in process 55 examines the value of a signal that is produced to detect a non-zero value, and passes non-zero value signals to an analysis module 420 for further analysis of the non-zero value signal. However, if a "zero signal value" is detected in one specific direction, the process will move back to 416 in which the shooting will continue in another direction.

The shroud diameter in a physical unit is calculated in step 420 based on the received signals. To improve the accuracy, the process uses symmetry characteristics of beam pairs to calculate the shroud diameter. That is, the shroud diameter calculated from one specific shooting direction is equal to the sum of the free path length of two collinear beams.

For example, beams 510a to 510g shown in FIGS. 15D-1 to 15D-3 are collinear in respective pairs, and their free path lengths are summed up to obtain the shroud diameter at that specific direction. These shroud diameters are then averaged for all shooting directions.

Under normal conditions, fan clearance region in the shroud image should be clean without any other objects, and therefore, the noise-to-value ratio is very low. Noise may increase if users mistakenly name or assign wrong part identifiers (PIDs) to other parts of the axial fan besides the shroud.

Figure 15F:
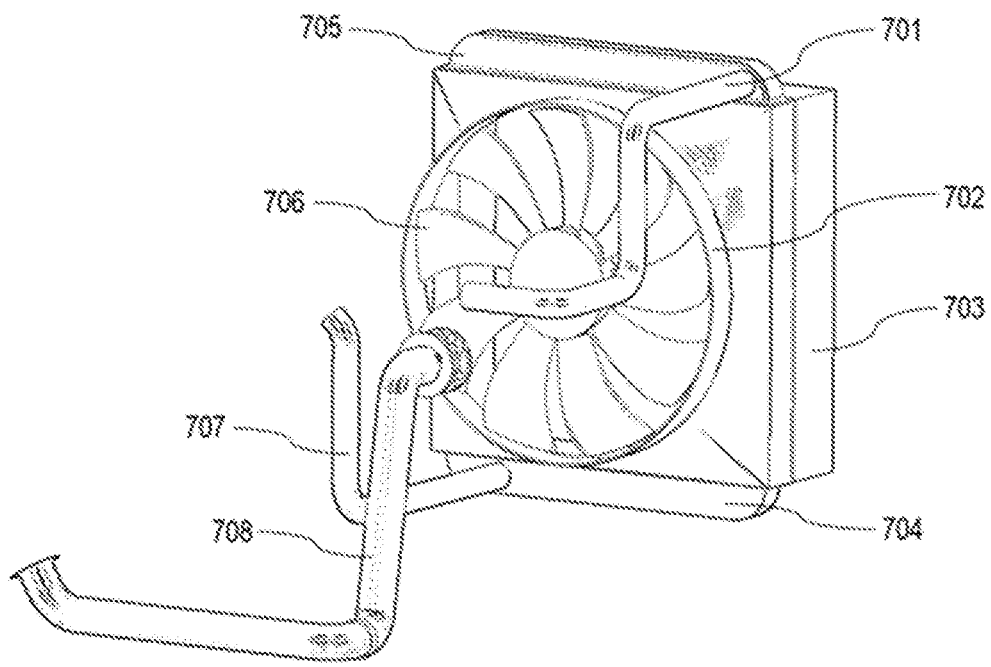

FIG. 15F illustrates such an example in which a radiator inlet hose 701, cooling package seal 703, bottom coolant tank 704, top coolant tank 705, radiator outlet hose 707 and another hose 708 are all misidentified with PID's as the shroud, although only part 702 is the actual shroud. When this happens, beams strike a surface earlier than they should when hitting objects whose projections fall into the fan clearance region in the image. Thus, the measured shroud diameter will be lower than the true value.

The process 55 uses a high-pass filter to filter 420 to help address issues caused in situations such as in FIG. 15F. From the high-pass filter 420 the signals that are received significantly improves the accuracy of the process 55. In addition, the process 55 performs reversible Boolean operations in the three normal directions of the fan bounding box on the inputted shroud geometries before generating the images to reduce noise.

Figure 15G:
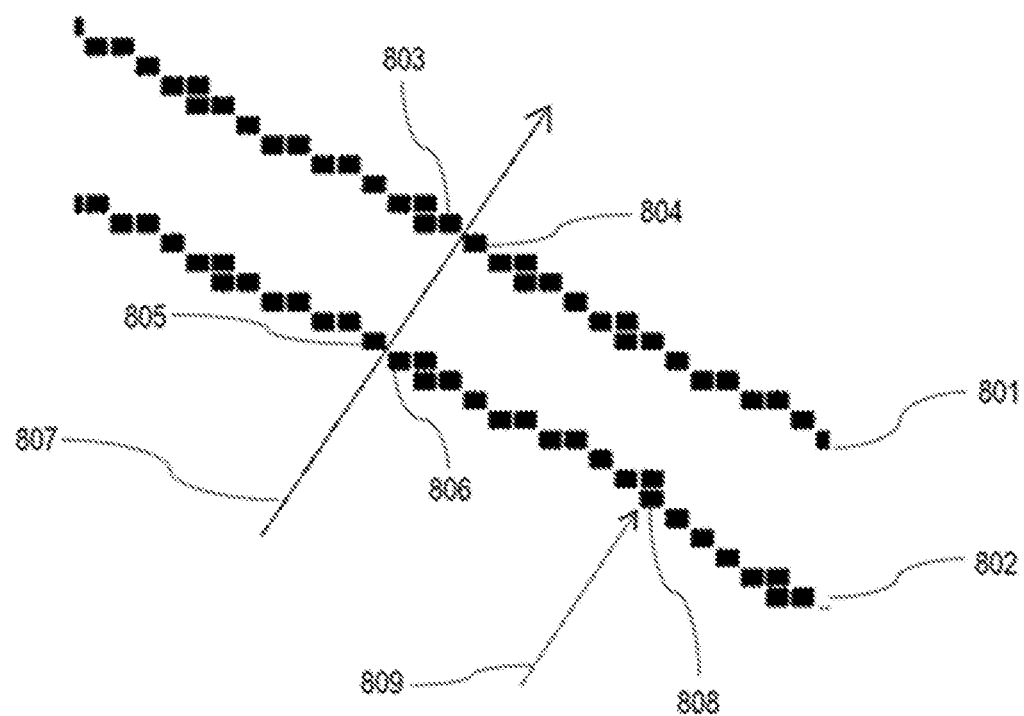

FIG. 15G illustrates a special scenario under which beam leakage happens and which can result in significant errors. The black squares in FIG. 15G represents the non-zero pixels in the generated shroud outline image. In certain locations, two neighboring square pixels share only one vertex and the beam passes by this vertex without intersecting with any targeting pixels. This is another form of beam leakage in addition to the case illustrated in FIG. 15E.

The pixels are represented as squares. Those pixels representing concentric shroud outlines are pixel set 801. Pixels in the pixel set 801 are the actual shroud opening inner boundary, whereas pixels in pixel set 802 are noise. Ideally, a beam 809 will hit a pixel 808 and generate a valid signal.

However, due to the uncertainties in pixel arrangements or locations when representing the circles or any other shapes, a beam 807 can penetrate through pixel pairs, e.g., pixels 805 and 806, or even further through another, outer pixel pair, e.g., pixels 803 and 804. This introduces significant errors that can be resolved by including the nearest neighbors of the target pixels when searching.

In this specific example shown in FIG. 15G, either 805 or 806 will be returned as the target pixel to generate a valid signal. To calculate a distance the system determines a difference between an origin pixel (0.0.0) and the location of pixel 808 (x.y.z), e.g., for three dimensions or (0,0) to (x,y) for two dimensions.

The disclosed embodiments may offer one or more of following advantages over existing solutions: The process is automated while the existing solutions are typically manual processes. It is envisioned that the automated process will have relatively high accuracy in comparison to visual checking that is highly dependent on the skill of the person who performs the inspection. The process can determine rotating direction relatively quickly in comparison to the manual process that may take longer depending on the expertise level of the inspecting person and the complexity of the fan. The disclosed embodiments can automatically calculate the airflow direction in the local coordinate system and pass this information to the numerical simulation while the existing process is manual.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of nonvolatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method for determining shroud size of an axial fan, the method comprises:
   receiving by a computer processing system digital data of a three-dimensional representation of a shroud and an axial fan;
   partitioning by the computer processing system, the received digital data into a first partition corresponding to a shroud segment and a second partition corresponding to an axial fan segment;
   determining by the computer processing system, a shroud boundary ring for the shroud segment;
   applying by the computing processing system to an image of the first partition, a series of beams to determine in pixels a shroud diameter of the shroud;
   determining by the computing processing system pixels in the image that have values that produce a signal indicating that the pixels are coincident with portions of the shroud; and
   calculating by the computer processing system, the shroud diameter from information from the series of beams, including beam angles and length of travel of the series of beams when the signal is detected.

2. The method of claim 1, further comprising:
   determining a viewing angle of the shroud boundary ring.

3. The method of claim 1, further comprising:
   repeating applying the beams and determining until the signal is detected.

4. The method of claim 1, wherein calculating the shroud diameter further comprises:
   determining from the digital data of the three-dimensional representation of the axial fan, a two-dimensional projection of the shroud to determine the shroud boundary ring.

5. The method of claim 4 wherein the calculated shroud diameter is determined in pixels using digital image of the feature lines of the fan so that a conversion ratio between physical units and pixel is obtained.

6. The method of claim 4 further comprising:
   calculating a value corresponding to the center of the fan using the fan image; and
   passing the calculated center value to the determining the signal.

7. The method of claim 4 wherein a viewing vector, a depth of the field of view, and the image resolution are based on the fan diameter so that the dimensions of the fan and the shroud do not affect measurement accuracy.

8. The method of claim 4 wherein the applying the beams emits plural beams from the fan edges in plural directions to search for the shroud inner circle to reduce the computational cost and increase the signal-to-noise ratio when multiple concentric circles are present.

9. The method of claim 4 further comprises:
   excluding certain directions; and
   applying high-pass filtering to the determined signal to improve measurement accuracies for structures present along the opening or when the shroud opening is less circular after discretization.

10. The method of claim 4 further comprising:
    searching for target pixels along the beam moving direction and among neighboring pixels.

11. A computer system comprising:
    one or more processors;
    memory operatively coupled to the one or more processors, and
    computer storage storing a computer program for determining shroud size of an axial fan that comprises instructions to cause the computer system to:
    receive digital data of a three-dimensional representation of a shroud and an axial fan;
    partition the received digital data into a first partition corresponding to a shroud segment and a second partition corresponding to an axial fan segment,
    determine a shroud boundary ring for the shroud segment;
    apply to an image of the first partition a series of beams to determine in pixels a shroud diameter of the shroud;
    determine pixels in the image that have values that produce a signal indicating that the pixels are coincident with portions of the shroud; and
    calculate the shroud diameter from information from the series of beams, including beam angles and length of travel of the series of beams when the signal is detected.

12. The system of claim 11, further comprising instructions to:
    determine a viewing angle of the shroud boundary ring; and
    repeat instructions to apply the beams; and instructions to determine until the signal is detected.

13. The system of claim 11, further comprising instructions to:
    determine from the digital data of the three-dimensional representation of the axial fan, a two-dimensional projection of the shroud to determine the shroud boundary ring.

14. The system of claim 11, wherein the calculated shroud diameter is determined in pixels using digital image of the feature lines of the fan so that a conversion ratio between physical units and pixel is obtained.

15. A computer program product stored on an non-transitory computer readable medium for determining shroud size of an axial fan, the computer program product including instructions for causing a system comprising one or more processors and memory to:
    receive digital data of a three-dimensional representation of a shroud and an axial fan;
    partition the received digital data into a first partition corresponding to a shroud segment and a second partition corresponding to an axial fan segment;
    determine a shroud boundary ring for the shroud segment;
    apply to an image of the first partition, a series of beams to determine in pixels a shroud diameter of the shroud;

determine pixels in the image that have values that produce a signal indicating that the pixels are coincident with portions of the shroud; and calculate the shroud diameter from information from the series of beams, including beam angles and length of travel of the series of beams when the signal is detected.

16. The product of claim 15, further comprising instructions to:

determine a viewing angle of the shroud boundary ring; and repeat instructions to apply the beams; and instructions to determine until the signal is detected.

17. The product of claim 15 wherein instructions to calculate the shroud diameter further comprises instructions to:

determine from the digital data of three-dimensional representation of the axial fan, a two-dimensional projection of the shroud to determine the shroud boundary ring.

18. The product of claim 17 wherein the calculated shroud diameter is determined in pixels using digital image of the feature lines of the fan so that a conversion ratio between physical units and pixel is obtained.

* * * * *